United States Patent [19]

Alink

[11] Patent Number: 4,529,409
[45] Date of Patent: Jul. 16, 1985

[54] PROCESS FOR THE PREPARATION OF A COMBUSTIBLE GASEOUS MIXTURE

[75] Inventor: Aloysius J. W. O. Alink, Zevenaar, Netherlands

[73] Assignee: Thomassen International B.V., Netherlands

[21] Appl. No.: 550,965

[22] Filed: Nov. 14, 1983

[30] Foreign Application Priority Data

Nov. 17, 1982 [NL] Netherlands ............... 8204451

[51] Int. Cl.³ ........................... C01B 3/36
[52] U.S. Cl. ........................... 48/211; 48/215
[58] Field of Search ............... 48/200, 201, 202, 211, 48/212, 213, 214 R, 215; 60/39.12, 39.35, 39.464

[56] References Cited

U.S. PATENT DOCUMENTS

| 4,277,938 | 7/1981 | Belke et al. | 60/39.35 X |
| 4,282,009 | 8/1981 | Belke et al. | 60/39.35 X |
| 4,317,658 | 3/1982 | Hendriks et al. | 60/39.35 X |
| 4,401,440 | 8/1983 | Alink | 48/211 X |

FOREIGN PATENT DOCUMENTS

| 1243316 | 6/1967 | Fed. Rep. of Germany | 48/211 |
| 3052507 | 5/1978 | Japan | 48/211 |

Primary Examiner—Peter Kratz
Assistant Examiner—Joye Woodard
Attorney, Agent, or Firm—James E. Nilles

[57] ABSTRACT

The invention concerns a process for the preparation of a combustible gaseous mixture or product gas from a nongaseous fuel in which a gasifier is used provided with a rotatably driven cup-shaped support grate 3. A granular or pulverized refractory auxiliary material and fuel are continuously fed to the inner side of said grate, a gasification medium or process gas being fed to the outer side of the grate, whereupon the resulting product gas and the exhausted auxiliary material with ash from the fuel, are discharged separately. According to the invention the fuel consists, at least partly, of a residual oil previously fed into the fuel chamber 14, 15.

5 Claims, 1 Drawing Figure

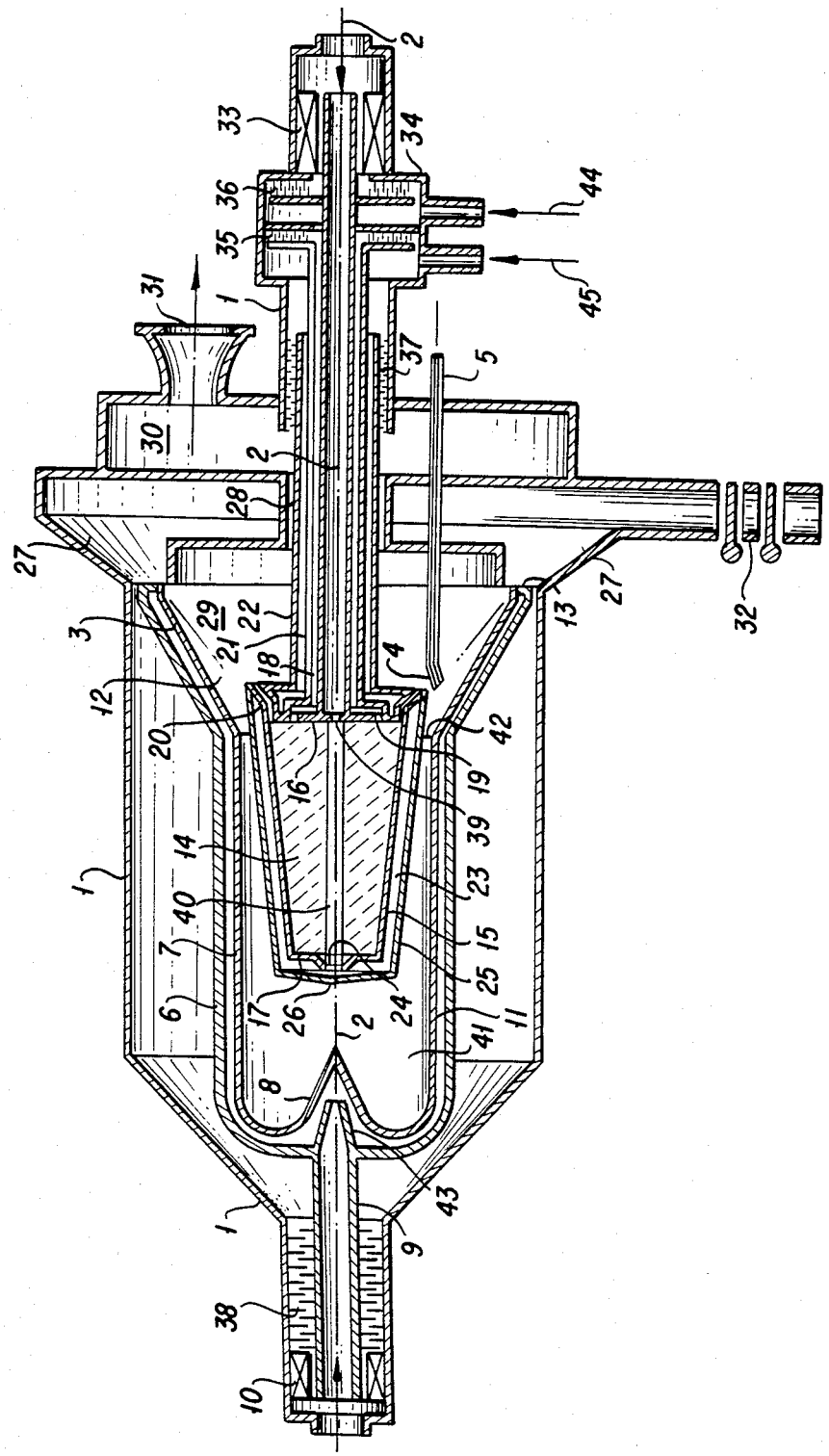

PROCESS FOR THE PREPARATION OF A COMBUSTIBLE GASEOUS MIXTURE

BACKGROUND OF THE INVENTION

1. Field of the Invention

This invention relates to a process for the preparation of a combustible gaseous mixture (product gas) from a non-gaseous fuel, using a gasifier of the type comprising a rotatably driven cup-shaped divergent support grate constructed as a body of revolution, wherein a granular or pulverized refractory auxiliary material and the fuel are continuously fed to the inner side of said rotating grate, a gasification medium (the process gas) is fed to the outer side of the grate, and the resulting product gas and the exhausted auxiliary material with ash from the fuel are discharged separately from the gasifier.

2. Description of the Prior Art

A process of this kind is disclosed in U.S. Ser. No. 476,205 filed on Mar. 17, 1983 in the name of the present Applicant (assignee: Thomassen International B.V.).

In this known process, the auxiliary material used forms a bed which, as a result of the angle of inclination of the inner side of the support grate and the influence of centrifugal force, gradually slides from the supply point, at the narrowest part of the support grate, toward the peripheral edge at the widest part of the grate. The fuel which is deposited on this sliding bed can then be converted into the required product gas by means of the process gas.

Although this known process gives a satisfactory result for solid fuel and many forms of liquid fuels, difficulties may arise with certain heavy, so-called residual oils, in connection with cracking that causes caking. During the cracking of the said oil the light fractions are separated, so that only the heavy fractions, mainly tar and asphalt, remain. The result is caking on the sliding bed, so that the required gradual displacement of this bed with the fuel resting thereon, is disturbed.

SUMMARY OF THE INVENTION

It is a main object of the present invention to provide a process in which the said disadvantage is obviated whilst the occurrence of caking is avoided.

This object is attained in the process according to the invention, in that the fuel to be gasified consists, at least partly, of a residual oil which is previously brought into a fuel chamber with a centrifugal field, inside which a hot gas is prepared from the lighter fraction by means of boundary-layer gasification, the hot gas then being discharged from the chamber to be mixed with the heavier fraction which is leaving the chamber and which then is converted into carbon particles that then land on the bed of auxiliary material situated against the inner side of the support grate.

In the centrifugal field of the fuel chamber the residual oil is split into a heavier fraction in the outermost zone and a lighter fraction in the central part of the fuel chamber. The lighter fraction gasifies, and the heavier fraction flows out in the direction of the support grate. However, before this heavier fraction reaches the support grate with the sliding bed thereon, this fraction is converted, by means of the hot gases produced from the fuel chamber, into soot particles, and these particles can completely gasify during their residence on the coating layer.

In an embodiment of the process according to the invention, an oxidizer/$H_2O$ mixture is injected inwardly and centrally at one side of the fuel chamber, effecting a gasification of the lighter fraction of the fuel, and the gas produced leaves the other side of the fuel chamber centrally, together with a metered quantity of $H_2O$ for the envisaged mixing with the heavier fraction of the fuel. $H_2O$ may, in this case, be either water or steam, while the oxidizer may consist of air or oxygen.

According to this process, in addition to the known compressed air flow for the gasification of the fuel on the sliding bed, a second compressed air flow is used for the gasification of the lighter fraction of the fuel inside the fuel chamber.

Furthermore the invention is embodied in a device for preparing a clean and combustible gaseous mixture (product gas) from a non-gaseous fuel, using the process as described above and comprising a housing containing therein a divergent cup-shaped support grate driven to rotate about a center-line and constructed as a body of revolution, said support grate being provided with means for supplying a granular or pulverized refractory auxiliary material to the inner side of the narrowest part of the grate in order to form—during operation—a bed that slides along the inner side of the support grate, means for supplying the fuel to said bed, and furthermore means for discharging exhausted auxiliary material with ash from the fuel, said device further being provided with means for supplying a gasification medium (the process gas) to the outer side of the support grate, the housing being provided with an outlet for the product gas, and means being provided for driving the support grate.

These means are also known from the earlier Patent Application Ser. No. 476,205 filed 3/17/83.

According to the invention, in the present device the means for supplying the fuel to the bed inside the support grate consist of a separate chamber in the form of a rotatably driven body of revolution, inside which the lighter fraction of the supplied liquid fuel is converted into a hot gas by way of boundary-layer gasification, the fuel chamber being provided with a central aperture at one end for the passage of said hot gas, while at the other end the chamber is provided at the periphery with a passage for the heavier fraction, said passage being situated near the narrowest part of the support grate, a beaker-shaped enclosing wall adjoining the support grate being provided for conducting the hot gas around the outer side of the chamber toward the passage for the heavier fraction.

When using a device of this type, the fuel in the fuel chamber must first be ignited. This can be done by supplying hot air, so that spontaneous ignition occurs, or by briefly supplying combustible gs and igniting it electrically inside the fuel chamber.

BRIEF DESCRIPTION OF THE DRAWING

The features referred to herein before and other specific details of both the process and the device according to the invention will be explained in detail hereinafter with reference to the drawing, showing a longitudinal section of one embodiment of the device according to the invention.

DESCRIPTION OF THE PREFERRED EMBODIMENT

The embodiment of the fuel gasifier according to the invention as illustrated in the drawing consists of a housing 1 having a support grate 3 therein, which is driven to rotate about a center-line 2 and which is constructed as a body of revolution having a truncated conical shape diverging from the left to the right. Near the top of this conical support grate the end 4 of a supply pipe 5 is situated. This pipe forms part of the means provided for feeding a granular or pulverized refractory auxiliary material to the narrowest part of the support grate 3. The support grate 3 is provided with means, which will subsequently be described more in detail for producing a rapid rotation about the center-line 2. A casing 6 is disposed around the outer side of the support grate 3 with some clearance, through which a gasification medium (process gas) can be fed to the outer side of the support grate. So far the construction corresponds to the fuel gasifier according to Ser. No. 476,205 referred to herebefore.

At the top the truncated conical support grate 3 is connected to a beaker-shaped enclosing wall 7, the bottom of which being an inwardly directed conical point 8. The above-mentioned casing 6 also encloses the wall 7 and is provided at the center-line 2 with a support pipe 9. This pipe has various functions, such as rotatably supporting the casing 6 that surrounds the wall 7 and support grate 3 in a bearing 10, the latter also acting as the drive motor for the rotation of the elements 3, 6 and 7. The pipe 9 also serves as a supply for the process gas which can flow to the outer side of the support grate 3 via the space 11 between the casing 6 and the wall 7. During operation, a bed or support layer 12 of the auxiliary material will be maintained along the inner side of the grate 3 as a result of its rotation due to the centrifugal acceleration occurring. This layer flows in the direction of the free edge 13 of the support grate 3.

The most characteristic feature of the present invention concerns the manner in which the fuel to be gasified is fed to the said bed 12. To this end, a separate fuel chamber 14 is provided in the form of a rotatably driven body of revolution (in this case a cone 15) inside the wall 7. The cone 15 is truncated and is provided with a front face 16 at the base of the cone situated at the right-hand side in the drawing, and a front face 17 at the top of the cone. The axis of the cone 15 coincides with the center-line 2 so that the fuel chamber 14 is coaxially disposed with respect to the support grate 3. The front face 16 is connected to a central injection duct 18 for an air/water or air/steam mixture and comprises an aperture 39 for supplying this mixture to the fuel chamber 14. Front face 16 is furthermore, provided with a ring-shaped series of fuel supply apertures 19 disposed around the duct 18. The front face 16 has at least one passage 20 along its periphery.

The inlet tubes 21 and 22 are disposed coaxially in respect of the central injection duct 18. Via the annular space inside the tube 21 the liquid fuel to be gasified, in this case a residual oil, is fed toward the chamber 14 through the apertures 19. Via the annular space inside the tube 22 cooling water is supplied. In this connection, the periphery of the cone 15 is of double-walled construction with an intermediate space 23. Near the front face 16 this space is connected to this inlet tube 22. In the front face 17 at the top of the cone 15 a central aperture 24 is provided for the discharge of the hot gas. The outer wall 25 of the intermediate space 23 is provided with a discharge aperture 26 situated opposite said aperture 24 for the cooling liquid or steam which, in the meantime, has reached a low temperature.

The housing forms a box-shaped collecting space 27. Herein the exhausted auxiliary material together with the ash from the fuel from bed 12 can be collected, said material being slung away by the centrifugal force. The collecting space 27 provides a free annular passage 28 outside the inlet tube 22. This passage forms a connection between the gasification space 29 inside the support grate 3 and a discharge chamber 30 for the product gas which can be discharged via the outlet aperture 31. The collecting space 27 is connected through a lock construction 32, to a discharge for the exhaused auxiliary material together with the ash from the fuel.

The fuel chamber 14 is driven by means of the central injection duct 18, which is constructed in the form of a pipe and which, at its end farthest to the right in the drawing, is provided with a support bearing 33 which is also constructed as a rotation motor. Not only the duct 18, but also the tubes 21 and 22 rotate with the fuel chamber 14. For the supply of the cooling water and of the residual oil, a casing 34 in the part of the housing 1 farthest to the right in the drawing, is formed with seals 35 and 36 between the stationary and rotating parts. The casing 34 has two connections 44 and 45 for the residual oil and the cooling water respectively. Another seal 37 is provided between the housing 1 and the inlet tube 22, and yet another seal 38 is provided at the other side of the housing 1 between the support pipe 9 and the housing 1.

The gasifier described operates as follows:

Hot or cold air mixed with steam or water respectively is supplied via the central injection duct 18 and flows through a narrow aperture 39 in the front face 16, into the fuel chamber 14. This flow produces an intensive turbulence inside this chamber, which is necessary for flame stabilization within the core 40 of this chamber. The residual oil enters the chamber 14 via the fuel supply apertures 19, the centrifugal field causing the lighter fraction to collect around the core 40. The heavier fraction is separated toward the conical wall 15. The cooling water fed via the tube 22 flows through the intermediate space 23.

The fuel around the core 40 is ignited; this can be done in two ways:

(a) by supplying hot air, resulting in spontaneous ignition as soon as this hot air comes into contact with the lighter fraction;

(b) briefly supplying a combustible gas to the air entering via the duct 18, and electrically igniting this gas in the core 40.

As a result of the high gas velocity inside the fuel chamber 14, a boundary-layer gasification will occur in which, if the air/steam or air/water ratio is kept constant, the air factor will remain constant within certain limits, irrespective of the velocity and mass flow of the steam/air or water/air mixture fed via the duct 18.

The gas formed in the core 40 has a temperature of between 1700 and 1900 K. and leaves the fuel chamber 14 via the central aperture 24. The cooling water flowing in the intermediate space 23 between the cone 15 and the outer wall 25, is added to the hot gas at the discharge aperture 26. As a result, the outgoing gas temperature will be reduced to 1200–1300 K. In the space 41 of the beaker-shaped wall 7, the gas flow is deflected, also by the conical point 8, and is fed via the annular passage 42 toward the gasification space 29. At the periphery this space is bounded by the continuously migrating support layer or bed 12 of the granular or pulverized refractory auxiliary material which is supplied via the extremity 4 of the pipe 5.

The heavier fraction of the residual oil leaves the rotating fuel chamber 14 via the passage 20, and, before reaching the migrating bed 12, is exposed to the hot gas flow entering the gasification space 29 via the passage 42. This heavier fraction will be directly converted into carbon particles which arrive at the bed 12 as a result of the centrifugal field. These carbon particles are gasified on the bed 12 by means of the process gas fed toward the outerside of the support grate 3 via the support pipe 9 and the space 11. This process gas consists of a steam-/air or water/air mixture. The support pipe 9 is provided with a construction 43 at its end directed toward the conical point 8 so that the space 11 is entered at high speed and the wall 7 is cooled. The combustible product gas formed in the space 29 leaves the latter via the annular passage 28, the discharge chamber 30 and the outlet opening 31.

The exhausted auxiliary material from the bed 12, together with the ash from the fuel, leaves the support grate via the free edge 13, and then reaches the collecting space 27 which can be left via the lock construction 32.

It should be noted that pulverized dolomite may be suspended in the residual oil, this suspension landing in the heavier fraction which comes into contact, via the passage 20, with the hot gas flow originating from the space 41 after passing the annular passage 42. As a result of the formation of carbon particles, the dolomite will land in the bed 12 with the carbon deposited thereon. The $H_2S$ formed during the gasification will then be bonded with the dolomite. This reacted dolomite leaves the gasifier via the lock construction 32 in solid form, together with the exhausted auxiliary material (which may also be dolomite) and with the ash.

The combustible product gas leaving the aperture 31 is clean and of a high temperature (1200 K.) and is at a certain superatmospheric pressure. This gas can be used directly in a gas turbine for example. In the process performed in the gasifier, two compressed air/water and air/steam currents are used, one via the support pipe 9 as the required process gas in the bed 12, and the other via the central injection duct 18 for maintaining the boundary-layer gasification inside the fuel chamber 14 and for converting the heavier fraction into carbon particles beyond the passage 20. In the embodiment described, the two rotating elements, i.e. the support grate 3 and the fuel chamber 14, each have their own drive 10, 33 respectively, which may have advantages over a common drive.

The following data can be given as an example:

---

Supply of hot, clean gas under pressure (1500 kPa).
Output: 4–40 MW produced gas including latent heat.
| Process gas: | |
|---|---|
| P = 1500 kPa | |
| T = 1173 K (in chamber 30) | |
| $H_2O$ supply: | 0.89 kg/kg oil |
| Air supply: | 1.95 $nm^3$/kg oil |
| Air factor: | 0.2 |
| Dolomite supply: | 0.161 kg/kg oil |
| Fuel composition: | |
| Residual oil: C: | 85.4% by weight |
| H: | 11.4% by weight |
| S: | 2.8% by weight |
| ash: | 0.4% by weight |
| Lowest calorific value: | 40.5 MJ/kg |
| SPG: | 0.96 |
| Product gas: composition: | $N_2$: 31.0 vol. % |
| | $H_2O$: 6.1 vol. % |
| | $CO_2$: 3.4 vol. % |
| | CO: 24.0 vol. % |
| | $H_2$: 33.3 vol. % |
| | $CH_4$: 2.2 vol. % |
| Lowest calorific value: | 7415 $kJ/nm^3$ |
| Highest calorific value: | 8279 $kJ/nm^3$ | g value at the average diameter of the support grate: 2500
Number of revolutions n of support grate 3 = 2700 rpm.
Number of revolutions n of fuel chamber 14 = 2700 rpm. if the output is 18 MW.

It is an additional advantage of the present invention that the gas obtained can be fed directly to a gas turbine, as described in Ser. No. 476,205 filed 3/17/83. Thereby no loss of latent heat will occur.

Although the present invention has been shown and described in connection with some preferred embodiments thereof, it will be apparent to those skilled in the art that many variations and modifications may be made without departing from the invention in its broader aspects. It is therefore intended to have the appended claims cover all such variations and modifications as fall within the true spirit and scope of the invention.

What is claimed is:

1. A process for the preparation of a combustible product gas mixture from a non-gaseous fuel, employing a gasifier comprising a rotatably driven enclosing wall to one end of which is coaxially fixed a conical, axially divergent support grate, and wherein the fuel and a granular or pulverized refractory auxiliary material are continuously fed to an inner side of said grate to form a sliding bed thereon, a process gas for gasification of the fuel is fed to the outer side of said grate, and the product gas and exhausted auxiliary material mixed with ash from the fuel are separately discharged from the gasifier, said process being characterized by: the fuel to be gasified consisting at least partly of a residual oil; before the fuel is fed to the inner side of said rotating grate, imparting rotation to the fuel while introducing said fuel into a separate rotating fuel chamber inside said rotating gasifier, wherein said fuel is centrifugally separated into a lighter fraction and a heavier fraction with the lighter fraction being converted by boundary layer gasification into a hot gas which is discharged at one end of said chamber while the heavier fraction is discharged at the other end of said chamber for movement through a gasification space and toward said sliding bed formed on said grate, and conducting the discharged hot gas to said gasification space by way of a passage formed between the fuel chamber and said enclosing wall of the gasifier to mix with the heavier fraction as the latter moves toward said sliding bed so that said heavier fraction is converted into carbon particles which land on said sliding bed.

2. The process of claim 1, in which an oxidizer/$H_2O$ mixture is injected inwardly and centrally at one side of the fuel chamber, effecting a gasification of the lighter fraction of the fuel, the hot gas produced leaving the other side of the fuel chamber centrally together with a metered quantity of $H_2O$ for mixing with the heavier fraction of the fuel.

3. The process of claim 1, in which a suspension of dolomite particles is prepared in the residual oil before this mixed oil is brought into the centrifugal field inside the fuel chamber.

4. The process of claim 1, in which the process gas consists of a steam/air or water/air mixture or an $O_2$/steam or $O_2$/water mixture.

5. The process of claim 1, in which the product gas is prepared at a considerable superatmospheric pressure of the order of 1,000–4,000 kPa.

* * * * *